(No Model.) 2 Sheets—Sheet 1.
F. H. BULLIS.
MACHINE FOR MELTING SNOW FROM CITY STREETS.
No. 593,980. Patented Nov. 23, 1897.
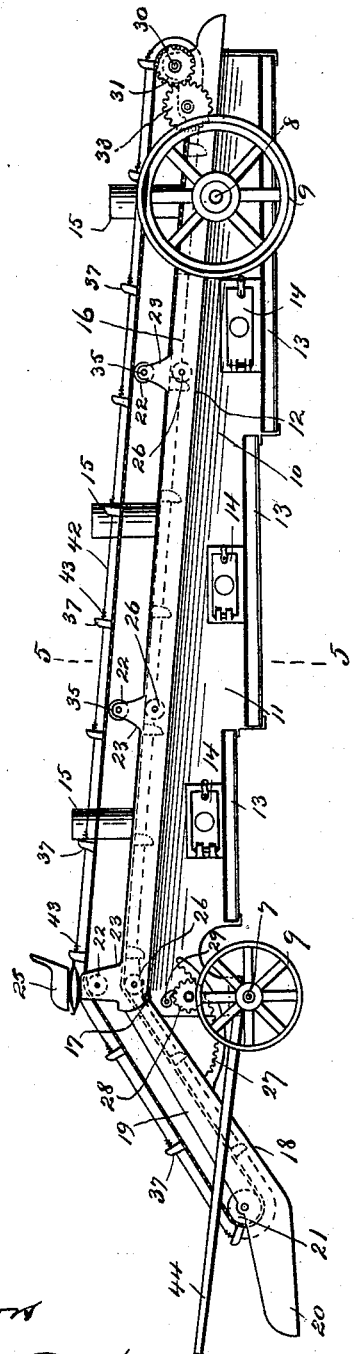
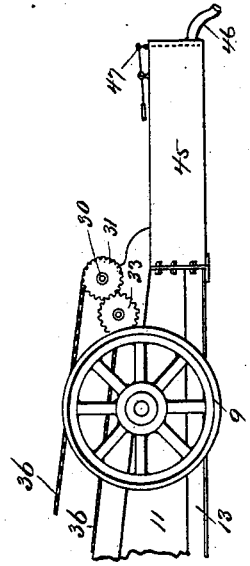
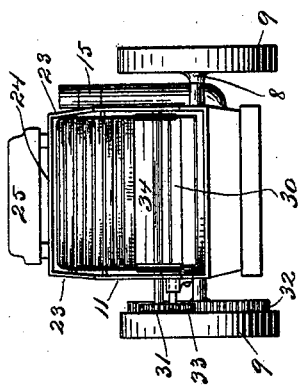
WITNESSES:
C. Nordfors
C. Gerst
INVENTOR
Franklin H. Bullis
BY
Edgar Tate & Co
ATTORNEYS.
THE NORRIS PETERS CO., PHOTO-LITHO., WASHINGTON, D. C.

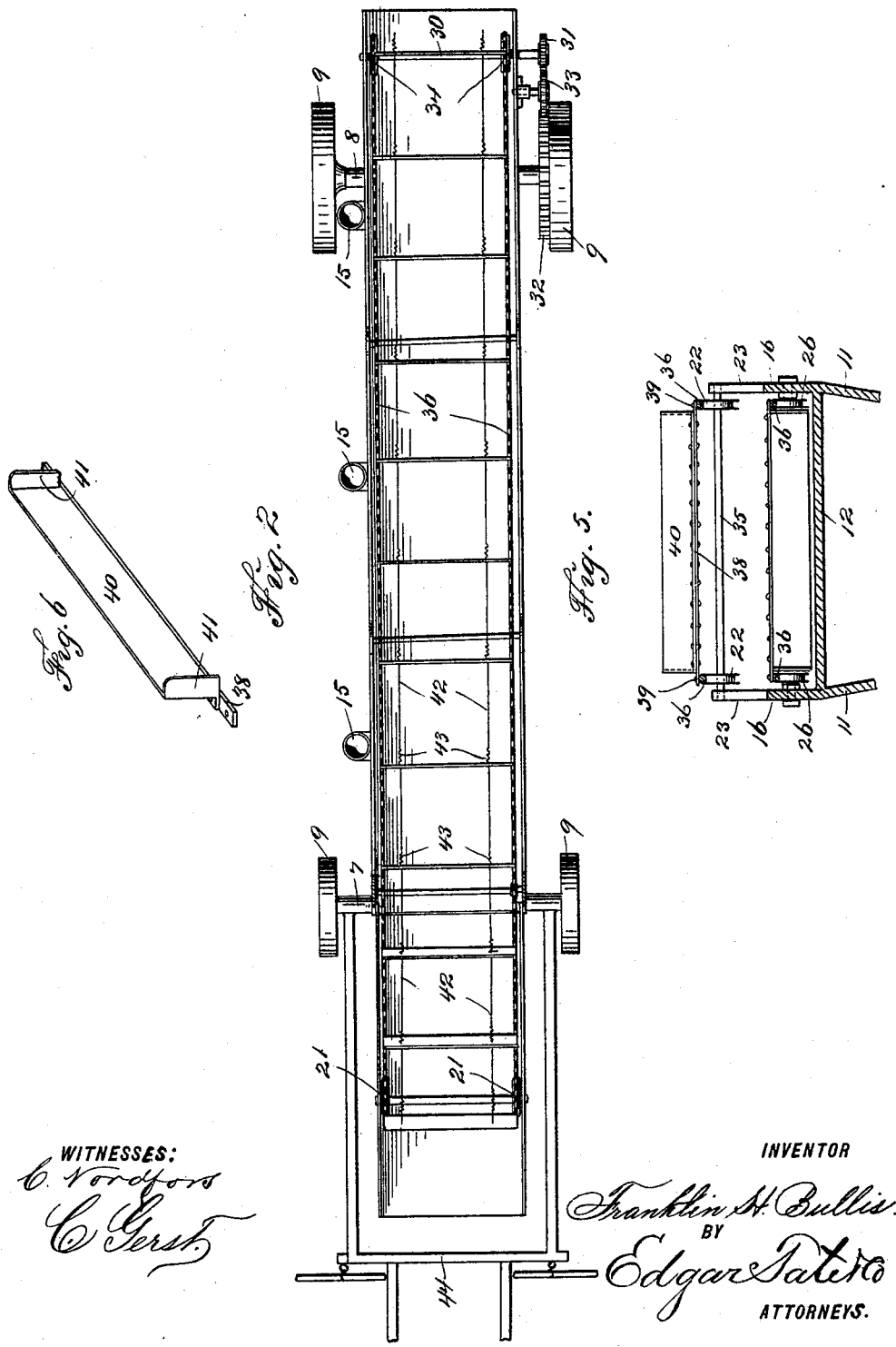

UNITED STATES PATENT OFFICE.

FRANKLIN H. BULLIS, OF BROOKLYN, NEW YORK.

MACHINE FOR MELTING SNOW FROM CITY STREETS.

SPECIFICATION forming part of Letters Patent No. 593,980, dated November 23, 1897.

Application filed May 22, 1897. Serial No. 637,802. (No model.)

*To all whom it may concern:*

Be it known that I, FRANKLIN H. BULLIS, a citizen of the United States, residing at Brooklyn, in the county of Kings and State of New York, have invented certain new and useful Improvements in Machines for Removing Snow from the Streets, of which the following is a full and complete specification, such as will enable those skilled in the art to which it appertains to make and use the same.

This invention relates to machines for removing snow from streets; and the object thereof is to provide an improved machine for this purpose by means of which snow may be removed from the streets and melted, and thus disposed of at a comparatively slight expense.

The invention is fully disclosed in the following specification, of which the accompanying drawings form a part, in which—

Figure 1 is a side view of my improved machine; Fig. 2, a plan view; Fig. 3, a rear end view of the machine; Fig. 4, a side view of the rear portion of the machine, showing a slight modification; Fig. 5, a partial section on the line 5 5 of Fig. 1; Fig. 6, a front perspective view of one of the buckets or scrapers which form a part of an endless-chain mechanism which I employ.

In the drawings forming part of this specification I provide a machine for the purpose herein specified which comprises a truck-frame which is mounted on axles 7 and 8, which are provided with wheels 9, and the truck-frame consists of a downwardly and backwardly inclined casing or frame 10, which is composed of side plates 11, a downwardly-inclined top plate 12, and a bottom portion divided, as shown in Fig. 1, into three separate horizontal portions, below each of which is placed a removable pan 13, and each of which is adapted to serve as a fire-pot or furnace-chamber, and each of which is provided in one side thereof with a door 14, through which the fuel may be passed, and opposite the doors 14 are smoke-pipes or escape-flues 15.

The fire-pots or furnace-chambers may be of any desired form of construction and any desired number thereof may be employed, and the bottoms thereof are provided with grates through which the ashes pass into the pan 13.

I have not shown the bottom of the fire pots or chambers nor the details of the construction thereof, for the reason that this construction may be of any preferred form, the only object being to provide a series of fire-pots or furnace-chambers beneath the downwardly-inclined top plate 12.

The side plates 11, which constitute the side walls of the fire-pots or furnace-chambers, are projected upwardly longitudinally above the downwardly-inclined plate 12, as shown at 16 in Figs. 1 and 5, and hinged to the forward end of the truck-frame or to the upwardly-directed portion 16 of the side plates 11, as shown at 17, is a forwardly and downwardly directed attachment 18, which is substantially of the same width as the top plate 12 of the fire pots or chambers and which is provided with upwardly-directed side plates 19 and a forwardly-directed chute or projection 20, by means of which the snow is gathered from the surface of the street, and the attachment 18 constitutes a pivoted extension of the truck frame or casing.

Mounted in the front end of the attachment 18 and at the opposite sides thereof are two sprocket-wheels 21, and other wheels or rollers are mounted along the upper sides of the truck frame or casing, as shown at 22, and the wheels or rollers 22 are supported by standards 23, formed on or secured to the upwardly-directed extension 16 of the side walls or plates 11 of the truck frame or casing, and the upwardly-directed standards 23, in which the front wheels or rollers 22 are mounted, are connected by a cross-plate 24, which serves to support a seat 25, this construction being shown in Figs. 1 and 3. Other rollers 26 are mounted inside of the upwardly-directed extension of the side plates or wheels 11, these rollers being shown in full lines in Fig. 5 and in dotted lines in Fig. 1, and one set of these rollers 26 is arranged adjacent to the pivotal support of the attachment 18 at the front end of the truck frame or casing, and said attachment 18 is provided with backwardly-directed segmental rack-bars 27, which operate in connection with ratchet-wheels 28, mounted at the sides of the front end of the truck frame or casing and each of which is provided with a pawl 29, which is pivotally connected with the truck frame or casing, and by means of this construction the front end of the attachment 18 may be raised or lowered whenever desired.

Mounted at the rear end of the truck frame or casing and over the end of the plate 12 is a shaft 30, one end of which is provided with a gear-wheel 31, and formed on the inner side of one of the wheels 9 of the truck-frame is a circular gear 32, and between the gear-wheel 31 on the shaft 30 and the circular gear 32 on the adjacent wheel 9 is an intermediate gear-wheel 33, by means of which the shaft 30 is operated. The shaft 30 is provided with two sprocket-wheels 34, and the wheels or rollers 26 are arranged in pairs on the opposite side of the truck frame or casing, and the wheels or rollers 22 are correspondingly arranged and mounted on shafts 35, which extend transversely of the truck frame or casing, and I also provide a snow carrier or conveyer, which consists of endless drive-chains 36, which are mounted at each side of the truck frame or casing, and which passes around the sprocket-wheels 21 and 34 and over the wheels or rollers 22 and 26, and these drive-chains are connected by transverse scrapers or buckets 37, which consist of transverse plates or bars 38, which are connected with the chains 36, as shown at 39 in Fig. 5, and secured to the transverse plates or bars 38 are outwardly-directed scrapers or carrier-plates 40, which are provided with end flanges 41, which are formed thereon and project forwardly at right angles thereto, this construction being best shown in Figs. 5 and 6. The outer edges of the buckets or scrapers 37 are connected by wires 42, in which are formed spring-coils 43, any desired number of which may be employed, and the object of these wires is to prevent the buckets or scrapers from wrenching the drive-chains or twisting the same off of the carrier wheels or rollers, and also to secure regularity in the operation of the device.

My improved machine may be propelled by any suitable power; but in Figs. 1 and 2 I have shown a frame 44, by means of which horses may be hitched thereto, and the operation will be readily understood from the foregoing description when taken in connection with the accompanying drawings and the following statement thereof.

In the operation of the device the attachment 18 is lowered, so that the forward end thereof will rest upon the ground or the surface of the street, and in practice the snow is first preferably swept into rows at each side of the street or at one side thereof and the forwardly-directed extension 20 of the attachment 18 serves as a shovel or scoop to take up the snow, and the carrier or conveyer carries the snow back over the top plate 12 of the fire-pots or furnace-chambers, where it is melted, and the water produced by the melting snow passes downwardly and backwardly over said plate 12 and is discharged at the rear end of the machine.

In Fig. 4 I have shown a tank 45, which is secured to the rear ends of the truck-frame and designed to receive the water formed by the melting snow, and said tank is provided with a discharge-pipe 46 and a valve 47, which controls the passage therethrough, and the object of the tank 45 is to carry the water formed by the melting snow to a sewer-opening or suitable place where said tank may be emptied. The intermediate gear-wheel 33, by which the snow carrier or conveyer is operated, may be thrown out of gear whenever desired, and any suitable devices may be provided to accomplish this result. The tank 45 is not an essential feature, however, and may or may not be employed, and it will be apparent that changes in and modifications of the construction herein described may be made without departing from the spirit of my invention or sacrificing its advantages.

Having fully described my invention, I claim as new and desire to secure by Letters Patent—

1. In a machine for removing snow from the streets, an attachment pivotally mounted on the forward end thereof, and adapted to be raised or lowered, said attachment being provided with a forwardly-directed chute, a snow carrier or conveyer mounted over the downwardly and backwardly inclined plate over the fire-boxes, and passing around sprocket-wheels mounted on said attachment and at the rear end of the truck-frame, the sprocket-wheels at the rear ends of the truck-frame being geared in connection with one of the wheels of the truck, said snow carrier or conveyer being provided with transverse buckets or scrapers which are connected by a wire or wires in which are formed spring-coils, substantially as shown and described.

2. A machine for removing snow from the streets comprising a truck, fire-boxes mounted thereon and provided with a backwardly and downwardly inclined upper surface or plate a pivotally-mounted attachment secured to the forward end thereof and adapted to be raised and lowered and an endless-chain conveyer mounted above said fire-boxes and extending into said pivotally-mounted attachment and adapted to slide snow along the upper surface of said fire-boxes and means for operating said endless-chain conveyer, substantially as and for the purpose described.

3. The herein-described machine for removing snow from the streets, comprising a truck, a casing mounted thereon, and provided with an upper surface, or plate which is backwardly and downwardly inclined, an attachment or scoop pivotally mounted on the forward end of said casing, a shaft mounted adjacent to the lower end of said attachment a second shaft mounted on the upper surface or plate adjacent to the rear end of said casing, an endless chain mounted upon said shafts, buckets mounted upon said chains and adapted to drag snow backwardly along the upper surface of said casing, a large gear-wheel mounted upon one of the rear wheels of the hub and pinions mounted adjacent thereto and adapted to operate therewith, said pinions being adapted to operate the said shaft mounted upon the rear end of said casing, substantially as and for the purpose described.

In testimony that I claim the foregoing as my invention I have signed my name, in presence of the subscribing witnesses, this 19th day of May, 1897.

FRANKLIN H. BULLIS.

Witnesses:
C. GERST,
S. L. HAWKSHURST.